(12) United States Patent
Nagatani (10) Patent No.: US 10,852,598 B2
(45) Date of Patent: Dec. 1, 2020

(54) OPTICAL DEVICE, DISPLAY DEVICE, AND ELECTRONIC APPARATUS

(71) Applicant: SONY CORPORATION, Tokyo (JP)

(72) Inventor: Shinpei Nagatani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/640,584

(22) PCT Filed: Jul. 19, 2018

(86) PCT No.: PCT/JP2018/027105
§ 371 (c)(1),
(2) Date: Feb. 20, 2020

(87) PCT Pub. No.: WO2019/049520
PCT Pub. Date: Mar. 14, 2019

(65) Prior Publication Data
US 2020/0225526 A1 Jul. 16, 2020

(30) Foreign Application Priority Data
Sep. 6, 2017 (JP) ................. 2017-170961

(51) Int. Cl.
*G02F 1/1347* (2006.01)
*G02F 1/1334* (2006.01)
*G02F 1/137* (2006.01)

(52) U.S. Cl.
CPC ........ *G02F 1/13476* (2013.01); *G02F 1/1334* (2013.01); *G02F 1/13725* (2013.01)

(58) Field of Classification Search
CPC .................................. G02F 1/13476
See application file for complete search history.

(56) References Cited

U.S. PATENT DOCUMENTS

2016/0320644 A1* 11/2016 Kim ...................... G02F 1/1334
2017/0261782 A1 9/2017 Lee et al.

FOREIGN PATENT DOCUMENTS

JP 07-159813 A 6/1995
JP 2007-264321 A 10/2007
(Continued)

OTHER PUBLICATIONS

International Search Report and Written Opinion of PCT Application No. PCT/JP2018/027105, dated Oct. 9, 2018, 9 pages of ISRWO.

*Primary Examiner* — Edmond C Lau
(74) *Attorney, Agent, or Firm* — Chip Law Group (57) ABSTRACT

There is provided a display device that exhibits superior display performance in a plurality of screen modes. The display device includes: an image display section that emits image display light having a first polarization axis; a beam splitter that transmits a portion of the image display light and reflects another portion of the image display light; a first dimmer member configured to switch between a first mode and a second mode, the first mode causing first light having the first polarization axis to be transmitted at a first transmittance and causing second light having a second polarization axis to be transmitted at a second transmittance lower than the first transmittance, the second mode causing the first light and the second light to be transmitted at a third transmittance higher than the first transmittance; and a second dimmer member configured to adjust a scattering intensity of transmitted light transmitted therethrough.

13 Claims, 9 Drawing Sheets

(56) References Cited

FOREIGN PATENT DOCUMENTS

| | | |
|---|---|---|
| JP | 2008-090173 A | 4/2008 |
| KR | 10-2017-0056558 A | 5/2017 |
| WO | 2016/043497 A2 | 3/2016 |

* cited by examiner

OPTICAL DEVICE, DISPLAY DEVICE, AND ELECTRONIC APPARATUS

CROSS REFERENCE TO RELATED APPLICATIONS

This application is a U.S. National Phase of International Patent Application No. PCT/JP2018/027105 filed on Jul. 19, 2018, which claims priority benefit of Japanese Patent Application No. JP 2017-170961 filed in the Japan Patent Office on Sep. 6, 2017. Each of the above-referenced applications is hereby incorporated herein by reference in its entirety.

TECHNICAL FIELD

The present disclosure relates to an optical device that switches between a transmission state where light is transmitted and a mirror surface state where light is reflected, and a display device and an electronic apparatus that include the optical device.

BACKGROUND ART

A display device has been known that is configured to be able to switch between a normal screen state (an image display mode or an external light transmission mode) and a mirror surface state (an external light reflection mode) (e.g., see PTLs 1 and 2) by overlaying two liquid crystal panels.

CITATION LIST

Patent Literature

PTL 1: Japanese Unexamined Patent Application Publication No. 2001-318374
PTL 2: Japanese Unexamined Patent Application Publication No. 2004-37943

SUMMARY OF THE INVENTION

Incidentally, in recent years, size of such a display device has been increased. Hence, when such a display device is installed on a wall surface inside a room or the like, an area of the display device with respect to an area of the wall surface tends to be increased, with the result that the display device increasingly influences the appearance of the interior of the room or the like.

It is therefore desirable to provide a display device that exhibits superior display performance in a plurality of screen modes, and an optical device that is suitably used therefor.

A display device according to an embodiment of the present disclosure includes, in order: an image display section that emits image display light having a first polarization axis; a beam splitter that transmits a portion of the image display light and reflects another portion of the image display light; a first dimmer member configured to switch between a first mode and a second mode, the first mode causing first light having the first polarization axis to be transmitted at a first transmittance and causing second light having a second polarization axis to be transmitted at a second transmittance lower than the first transmittance, the second mode causing the first light and the second light to be transmitted at a third transmittance higher than the first transmittance; and a second dimmer member configured to adjust a scattering intensity of transmitted light transmitted therethrough.

In the display device according to the embodiment of the present disclosure, for example, switching is performed between the image display state where the first dimmer member enters the first mode and the second dimmer member enters a transmission state to allow for display of the image display light and a bright display state where the first dimmer member enters the second mode and external light is scattered in the second dimmer member to thereby obtain a whitish color.

An optical device according to an embodiment of the present disclosure includes, in order: a beam splitter that transmits a portion of incident light and reflects another portion of the incident light; a first dimmer member configured to switch between a first mode and a second mode, the first mode causing a first transmittance for first light having a first polarization axis to be higher than a second transmittance for second light having a second polarization axis that is different from the first polarization axis, the second mode causing the first transmittance and the second transmittance to be substantially equal to each other; and a second dimmer member configured to adjust a scattering intensity of the display light transmitted therethrough.

In the optical device according to the embodiment of the present disclosure, for example, switching is performed among: a background display state where the first dimmer member enters the first mode and the second dimmer member is brought into a transmission state to display a background; a bright display state where the first dimmer member enters the second mode and external light is scattered in the second dimmer member to thereby obtain a whitish color; and a reflection state where the first dimmer member enters the second mode and the second dimmer member is brought into the transmission state to thereby reflect the external light that enters the second dimmer member from side opposite to the first dimmer member at the beam splitter.

According to the optical device of the embodiment of the present disclosure, the switching between the first mode and the second mode in the first dimmer member and the adjustment of the scattering intensity in the second dimmer member are appropriately performed, thus making it possible to achieve a plurality of desired optical states. In addition, according to the display device and an electronic apparatus of the embodiments of the present disclosure, it is possible to achieve superior display performance by utilization of the plurality of optical states described above.

The effects of the present disclosure are not limited thereto, and may be any of effects described hereinafter.

MODES FOR CARRYING OUT THE INVENTION

Embodiments of the present disclosure are described in detail below with reference to the drawings. The description is given in the following order.
1. First Embodiment (an example of a display device that includes a display section and two dimmer elements)
2. First Modification Example of First Embodiment
3. Second Modification Example of First Embodiment
4. Third Modification Example of First Embodiment (an example of a dimmer element that has scattering intensity distribution within a plane)
5. Fourth Modification Example of First Embodiment (another example of the dimmer element that has scattering intensity distribution within the plane)
6. Application Example of Display Device in First Embodiment (electronic apparatus)
7. Second Embodiment (an example of a dimmer device that includes two dimmer elements)

1. First Embodiment

[Configuration of Display Device 1]

Figure 1:
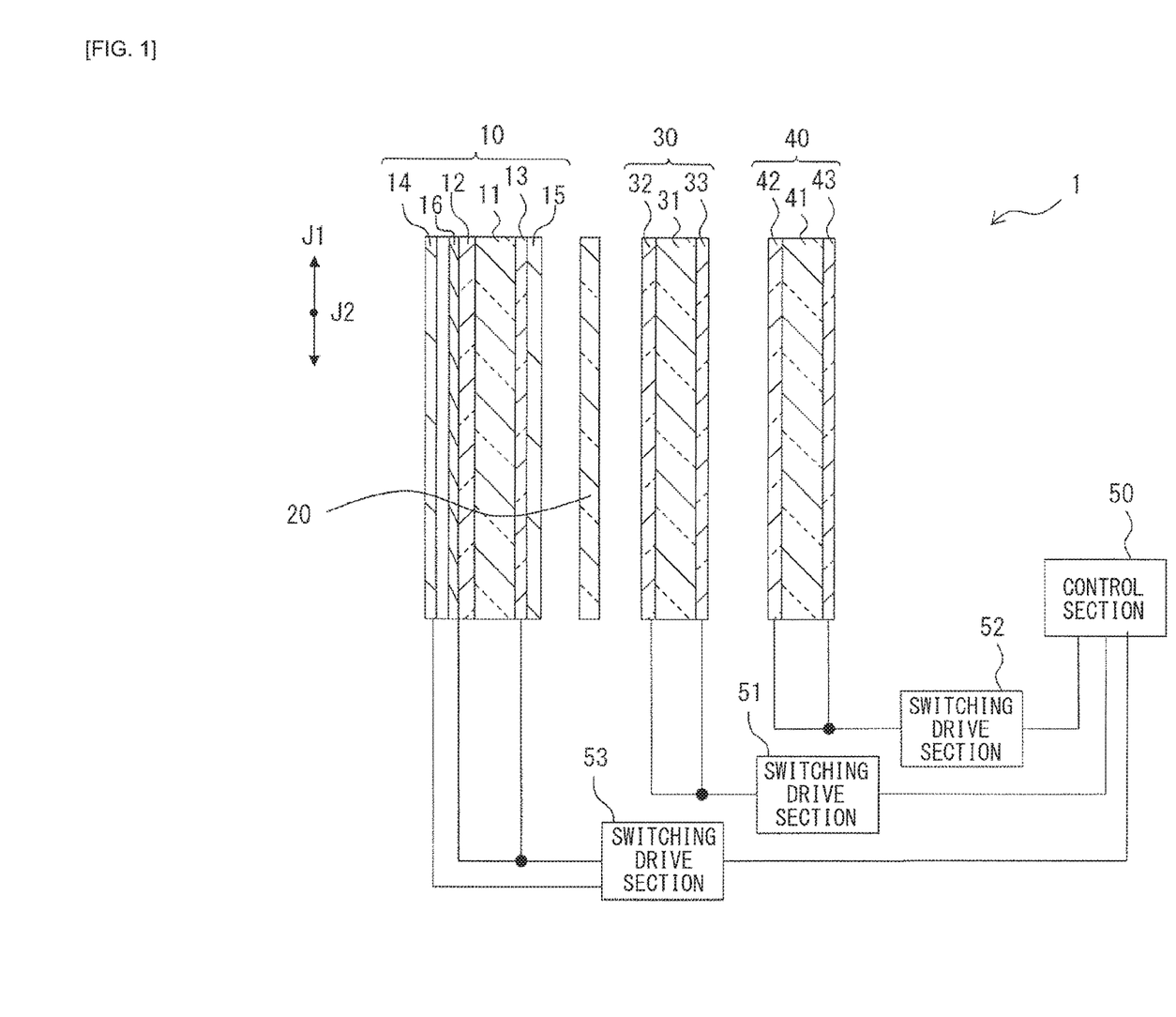
FIG. 1 is a schematic view of a display device according to a first embodiment of the present disclosure.
Figure 2:
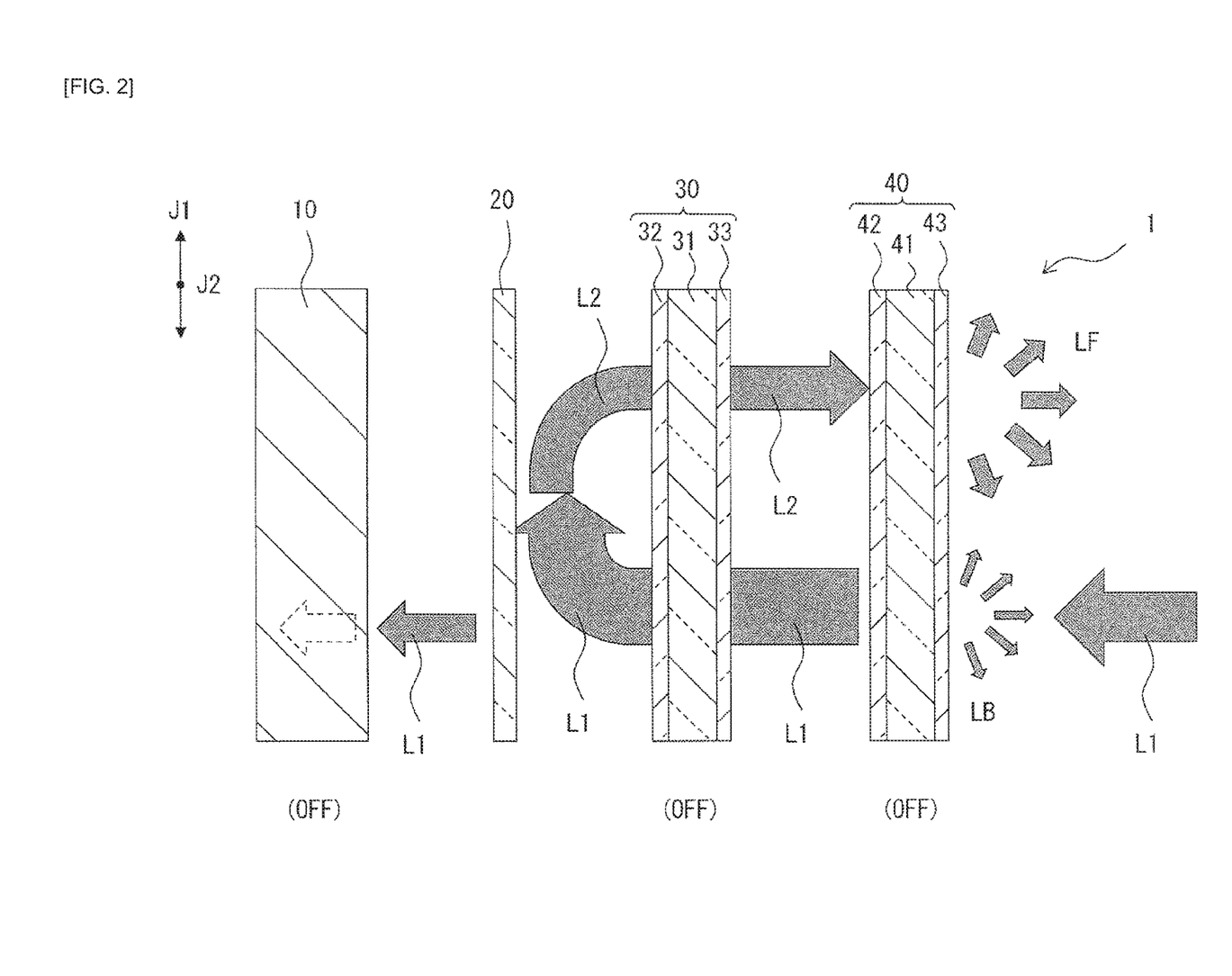
FIG. 2 is a first explanatory diagram illustrating workings of the display device illustrated in FIG. 1.
Figure 3:
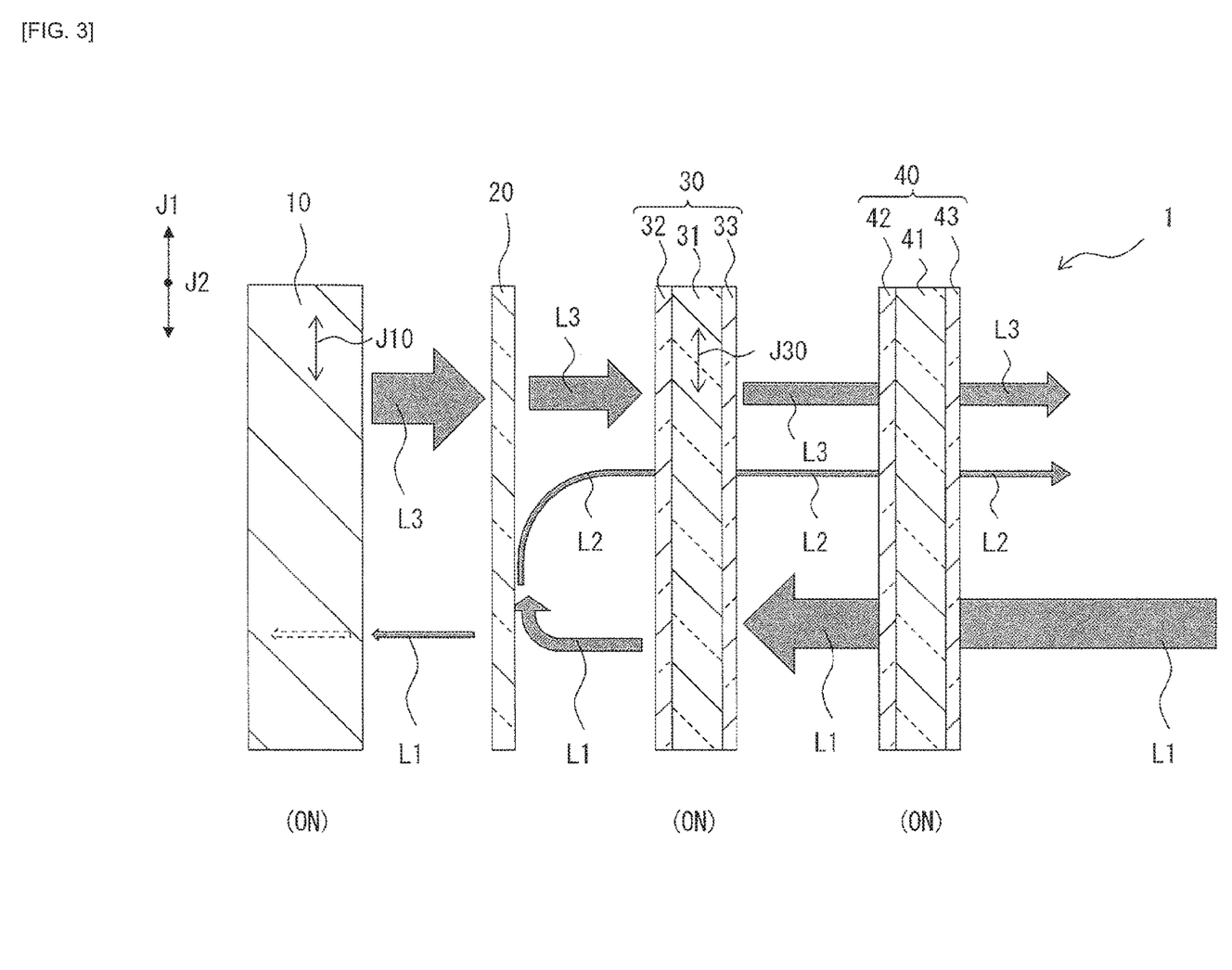
FIG. 3 is a second explanatory diagram illustrating the workings of the display device illustrated in FIG. 1.

FIG. 1 illustrates an overall configuration that includes a cross-section of a display device 1 of a first embodiment of the present disclosure. In addition, FIGS. 2 and 3 are each a conceptual diagram illustrating workings of the display device 1. The display device 1 is configured to be able to switch between a white display state and an image display state by overlaying two liquid crystal panels. Specifically, the display device 1 includes four components that are an image display section 10 in which main surfaces are sequentially disposed in layers to be overlaid on each other, a partial transmission mirror 20, a first dimmer element 30 (hereinafter simply referred to as a dimmer element 30), and a second dimmer element 40 (hereinafter simply referred to as a dimmer element 40). In the display device 1, the image display section 10, among the four components described above, is located farthest from an observer, and the dimmer element 40 is located closest to the observer.
(Image Display Section 10)
The image display section 10 emits image display light L3 (see FIG. 3) that forms a predetermined display embodiment toward the observer, and the image display light L3 may be preferably, for example, linearly polarized light that has a first polarization axis J1. For example, the image display section 10 includes: a transmission-type liquid crystal display panel that has a structure in which a liquid crystal layer 11 is sandwiched between a pair of transparent electrode substrates 12 and 13; a backlight 14 that is provided on side of a back surface thereof (side opposite to the observer) with an air layer being interposed therebetween; and polarization plates 15 and 16 that are provided on respective surfaces of the transparent electrode substrates 12 and 13. In the pair of transparent electrode substrates 12 and 13, for example, a transparent conductive layer is formed in a transparent substrate of glass (containing quartz) or the like. The pair of transparent electrode substrates 12 and 13 are disposed opposed to each other a predetermined distance (e.g., about 1.5 μm to 10 μm) apart and are joined together with a sealing material or the like. As described above, the image display section 10 is configured to enable the pair of transparent electrode substrates 12 and 13 to apply an electric field to the liquid crystal layer 11. As a drive mode of the image display section 10, either an active drive mode such as active matrix drive using an active element such as a TFT (Thin Film Transistor) or a TFD (Thin Film diode) or a passive drive mode such as simple drive or multiplex drive using no active element described above may be adopted.

As the liquid crystal mode of the liquid crystal layer 11, for example, a TN (Twisted Nematic) mode, a VA (Vertical Alignment) mode, an IPS (In Plane Switching) mode, an FFS (Fringe Field Switching) mode, an STN (Super Twisted Nematic) mode or an ECB (Electrically Controlled Birefringence) mode may be used. Liquid crystal display elements that have these liquid crystal modes are configured to achieve a display embodiment using polarization plates, thus making it possible to obtain high display quality while having a relatively low drive voltage, which is thus preferable.

The polarization plate 15 is, for example, an absorption-type polarization plate that has a transmission polarization axis J10 (FIG. 3) along the first polarization axis J1, transmits linearly polarized light that has a vibration plane parallel to the transmission polarization axis J10, and absorbs linearly polarized light that has a vibration plane parallel to a direction intersecting (preferably, orthogonal to) the transmission polarization axis J10. As the polarization plate 15, for example, it is possible to use a polarization plate in which respective protective layers of triacetyl cellulose are applied to both surfaces of a film that has a polarization function resulting from absorption of iodine in stretched polyvinyl alcohol. The polarization plate 16 has a transmission axis intersecting the polarization axis of the polarization plate 15.

As long as the backlight 14 makes it possible to illuminate the above-described transmission-type liquid crystal display panel including the liquid crystal layer 11 from behind at substantially uniform illuminance, any backlight may be used. Examples thereof include an end face light emission-type backlight that includes a light guide plate and a light source disposed on an end face part of the light guide plate, and a back surface light emission-type backlight that includes a diffusion plate and a light source disposed on a back surface of the diffusion plate.
(Partial Transmission Mirror 20)
The partial transmission mirror 20 is a beam splitter that transmits a portion of the image display light L3 and reflects another portion of the image display light L3. The partial transmission mirror 20 is, for example, a so-called half mirror in which a metal thin film is formed on a surface of a transparent acrylic plate, and a reflectance thereof for incident light is, for example, 60%.
(Dimmer Element 30)
The dimmer element 30 is an optical member configured to be able to switch between a first mode and a second mode. The first mode is a dark mode in which linearly polarized light having the first polarization axis J1 is transmitted at a first transmittance and in which linearly polarized light having a second polarization axis J2 orthogonal to the first polarization axis J1 is transmitted at a second transmittance lower than the first transmittance. The second mode is a bright mode in which both the linearly polarized light having the first polarization axis J1 and the linearly polarized light having the second polarization axis J2 are transmitted at a third transmittance higher than the first transmittance.

The dimmer element 30 is a guest-host type liquid crystal element that has a structure in which a guest-host type liquid crystal layer 31 including a guest host (Guest Host)-type liquid crystal is sandwiched between two transparent electrode substrates 32 and 33. In the dimmer element 30, liquid crystal molecules in the guest-host type liquid crystal layer 31 are vertically oriented in a direction orthogonal to a direction in which the transparent electrode substrate 32 and the transparent electrode substrate 33 are opposed to each other. The guest-host type liquid crystal layer 31 contains, for example, a pigment material such as a black pigment, and in the dark mode described above, the pigment material is oriented as in the orientation of the liquid crystal molecules included in the guest-host type liquid crystal layer 31. Hence, for example, a voltage is applied by the two transparent electrode substrates 32 and 33 to the guest-host type liquid crystal layer 31, and thus the liquid crystal molecules fall in an uniaxial direction, a transmission axis J30 is produced that is parallel to the uniaxial direction in which the liquid crystal molecules fall, i.e., in a direction along the first polarization axis J1, and an absorption axis is produced that is along the second polarization axis J2. In other words, the guest-host type liquid crystal layer 31 of the dimmer element 30 exhibits polarization along the transmission axis J30 is indicated by the application of the voltage, and exhibits a relatively high transmittance for linearly polarized light along the transmission axis J30. It is to be noted that the transparent electrode substrates 32 and 33 may preferably have configurations similar to those of the transparent electrode substrates 12 and 13.

(Dimmer Element 40)

The dimmer element 40 is an optical element that is able to adjust scattering intensity of light transmitted therethrough. For example, the dimmer element 40 is able to switch between a scattering mode exhibiting a first scattering intensity that is relatively strong for the light transmitted therethrough and a linear travel mode exhibiting a second scattering intensity for the light transmitted therethrough that is lower than the first scattering intensity. Specifically, the dimmer element 40 is a polymer dispersed liquid crystal (Polymer Dispersed Liquid Crystal) element that has a structure in which a polymer dispersed liquid crystal layer 41 is sandwiched between two transparent electrode substrates 42 and 43. The polymer dispersed liquid crystal layer 41 is, for example, a liquid crystal layer in which a nematic liquid crystal is dispersed in matrix structure of an acrylate polymer material or the like. The transparent electrode substrates 42 and 43 may preferably have configurations similar to those of the transparent electrode substrates 12 and 13. In the present embodiment, applying a voltage with the transparent electrode substrates 42 and 43 to the polymer dispersed liquid crystal layer 41 allows for switching to the linear travel mode (transparent mode) exhibiting the second scattering intensity. On the other hand, when a voltage is not applied to the polymer dispersed liquid crystal layer 41, switching is performed to the scattering mode exhibiting the first scattering intensity. The scattering mode described here is a specific example corresponding to a "third mode" of the present disclosure, and the linear travel mode (approximate transparent mode) is a specific example corresponding to a "fourth mode" of the present disclosure.

The display device 1 further includes a control section 50, a switching drive section 51, a switching drive section 52, and a switching drive section 53. The control section 50 performs operation control on the switching drive section 51, the switching drive section 52, and the switching drive section 53. The switching drive section 51 is coupled to the dimmer element 30, and performs, on the basis of a command from the control section 50, an operation of switching between the turning on and off of the voltage applied to the guest-host type liquid crystal layer 31. The switching drive section 52 is coupled to the dimmer element 40, and performs, on the basis of a command from the control section 50, an operation of switching between the turning on and off of the voltage applied to the polymer dispersed liquid crystal layer 41. The switching drive section 53 is coupled to the image display section 10, and performs lighting and extinction of the image display section 10 on the basis of a command from the control section 50.

[Operation of Display Device 1]

The display device 1 described above makes it possible to achieve a plurality of desired optical states by performing the operation of switching between the bright mode and the dark mode in the dimmer element 30 and the operation of switching between the scattering mode and the linear travel mode in the dimmer element 40. For example, switching is performed between the image display state where the dimmer element 30 enters the dark mode and the dimmer element 40 enters the linear travel mode to allow for display of the image display light of the image display section 10 and a bright display state where the dimmer element 30 enters the bright mode and the dimmer element 40 enters the scattering mode to scatter external light and to thereby obtain a whitish color.

In the following, description is given in detail, as an example of the operation of the display device 1, of behaviors in the two states that are the bright display state and the image display state described above.

(Behavior of Display Device 1 in Bright Display State)

In the display device 1, as illustrated in FIG. 2, when a voltage is applied neither to the guest-host type liquid crystal layer 31 of the dimmer element 30 nor to the polymer dispersed liquid crystal layer 41 of the dimmer element 40 (in the case of an off-state), the bright display state is achieved. In this case, the dimmer element 30 enters the bright mode in which all incident light beams including both the linearly polarized light having the first polarization axis J1 and the linearly polarized light having the second polarization axis J2 are transmitted at the third transmittance higher than the first transmittance in the dark mode. Meanwhile, the dimmer element 40 enters the scattering mode exhibiting the first scattering intensity that is relatively high for the light transmitted therethrough. It is to be noted that the image display section 10 is also switched to a state where the image display section 10 is turned off (off-state).

In the display device 1, in the bright display state illustrated in FIG. 2, for example, external light L1 that is applied from side of the observer to the dimmer element 40 is transmitted through the dimmer element 40 at, for example, a transmittance of about 95%, and thereafter enters the dimmer element 30. The external light L1 that has entered the dimmer element 30 is transmitted through the dimmer element 30 at, for example, a transmittance of about 74%, and thereafter enters the partial transmission mirror 20. In addition, a portion of the external light L1 that has entered the dimmer element 40 is backscattered light LB that is reflected to be scattered toward the side, of the observer, of the dimmer element 40. For example, about 60% of the external light L1 that has entered the partial transmission mirror 20 is reflected at the partial transmission mirror 20

(i.e., in this case, the partial transmission mirror 20 exhibits a reflectance of about 60%), and is returned as reflected light L2 to the dimmer element 30. It is to be noted that a portion of the external light L1 that has entered the partial transmission mirror 20 is transmitted through the partial transmission mirror 20 at, for example, a transmittance of about 40%, enters the image display section 10, and is absorbed within the image display section 10.

The reflected light L2 that is returned from the partial transmission mirror 20 to the dimmer element 30 is transmitted through the dimmer element 30 at a transmittance of about 74%, and thereafter enters the dimmer element 40. Furthermore, the reflected light L2 that has entered the dimmer element 40 from the partial transmission mirror 20 is transmitted through the dimmer element 40 at a transmittance of about 95% to be forward scattered light LF. As a result, in the entire display device 1, about 47% of the external light L1 that has entered the dimmer element 40 is outputted as the reflected light (the backscattered light LB and the forward scattered light LF) from the dimmer element 40 to the side of the observer. At that time, a surface of the dimmer element 40 on the side of the observer is brought into a milky display state. The reflectance of wall paper is generally assumed to be about 40% to about 70%; thus, in a case where the display device 1 of the present disclosure is installed on a wall surface, it is possible for the display device 1 to achieve the bright display state while sufficiently reducing an uncomfortable feeling with respect to the wall.
(Behavior of Display Device 1 in Image Display State)

In the display device 1, in a case where a voltage is applied both to the guest-host type liquid crystal layer 31 of the dimmer element 30 and the polymer dispersed liquid crystal layer 41 of the dimmer element 40 (in the case of an on-state), the image display state is achieved (FIG. 3). In this case, the dimmer element 30 exhibits polarization along the transmission axis J30 by orientation of the pigment material such as a black pigment contained in the guest-host type liquid crystal layer 31 along the direction in which the liquid crystal molecules are oriented. Hence, the dimmer element 30 enters the dark mode in which the linearly polarized light having the first polarization axis J1 is transmitted at the first transmittance and in which the linearly polarized light having the second polarization axis J2 is transmitted at the second transmittance lower than the first transmittance. Meanwhile, the dimmer element 40 enters the linear travel mode (approximate transparent mode) exhibiting the second scattering intensity for the light transmitted therethrough that is lower than the first scattering intensity. It is to be noted that the image display section 10 enters the display state (on-state).

In the display device 1, in the image display state illustrated in FIG. 3, for example, the external light L1 that is applied from the side of the observer to the dimmer element 40 is transmitted through the dimmer element 40 at, for example, a transmittance of about 98%, and thereafter enters the dimmer element 30. A linearly polarized component along the first polarization axis J1 of the external light L1 that has entered the dimmer element 30 is transmitted through the dimmer element 30 at, for example, a transmittance of about 46%, and a linearly polarized component along the second polarization axis J2 is transmitted through the dimmer element 30 at a transmittance of about 10%, and thereafter enters the partial transmission mirror 20. For example, about 60% of the external light L1 that has entered the partial transmission mirror 20 is reflected at the partial transmission mirror 20, and is returned as the reflected light L2 to the dimmer element 30. It is to be noted that a portion of the external light L1 that has entered the partial transmission mirror 20 is transmitted through the partial transmission mirror 20 at, for example, a transmittance of about 40%, enters the image display section 10, and is absorbed within the image display section 10. The reflected light L2 that is returned from the partial transmission mirror 20 to the dimmer element 30 is sequentially transmitted through the dimmer element 30 and the dimmer element 40. As a result, in the entire display device 1, about 12% of the external light L1 that has entered the dimmer element 40 is outputted as the reflected light L2 from the dimmer element 40 to the side of the observer. It is to be noted that, in a case where the image display section 10 is in the off-state or in a case where luminance of the image display light L3 emitted from the image display section 10 is extremely low, the reflected light L2 is visually recognized as a reflection image that is observed by the observer to overlap a black display.

In addition, the image display light L3 that travels from the image display section 10 toward the partial transmission mirror 20 is transmitted through the partial transmission mirror 20 at a transmittance of about 40%, and enters the dimmer element 30. The image display light L3 that has entered the dimmer element 30 is linearly polarized light having the first polarization axis J1. Thus, after the image display light L3 is transmitted through the dimmer element 30 at a transmittance of about 46%, the image display light L3 enters the dimmer element 40, and is thereafter transmitted through the dimmer element 40 at a transmittance of about 98%. As a result, in the entire display device 1, about 18% of the image display light L3 that is emitted from the image display section 10 is outputted from the dimmer element 40 to the side of the observer. Here, the luminance of the image display light L3 emitted from the image display section 10 is set high, thus making it possible to deliver, to the observer, the image display light L3 with sufficient luminance. It is to be noted that the luminance of the image display light L3 is set high, and an influence of the reflected light L2 is thereby reduced and thus does not interfere with the viewing of the observer.
[Workings and Effects of Display Device 1]

In the display device 1 of the present embodiment, as described above, the image display section 10, the partial transmission mirror 20, the dimmer element 30, and the dimmer element 40 are disposed in order, and an operation of switching between the bright mode and the dark mode is performed in the dimmer element 30 and scattering intensity is adjusted in the dimmer element 40. Hence, switching is performed between the image display state where the dimmer element 30 enters the dark mode and the dimmer element 40 enters the linear travel mode to allow for display of the image display light L3 and the bright display state where the dimmer element 30 enters the bright mode and the dimmer element 40 enters the scattering mode to scatter external light and to thereby obtain a whitish color. As a result, the display device 1 makes it possible to achieve a plurality of desired optical states and thus to achieve superior display performance by utilization of the optical states. Specifically, for example, a screen of the display device 1 when the image display section 10 is brought into the off-state is allowed to have a white display. Thus, even in a case where a size of the screen of the display device 1 is increased, it is possible to reduce a gap with texture of the surrounding wall surface. Hence, it is possible to avoid adverse effects on the appearance of the interior of a room. Moreover, in a case where the image display section 10 is brought into the on-state, it is possible to produce an image display that is suitable for viewing and is sufficiently favorable.

2. First Modification Example of First Embodiment

Figure 4A:
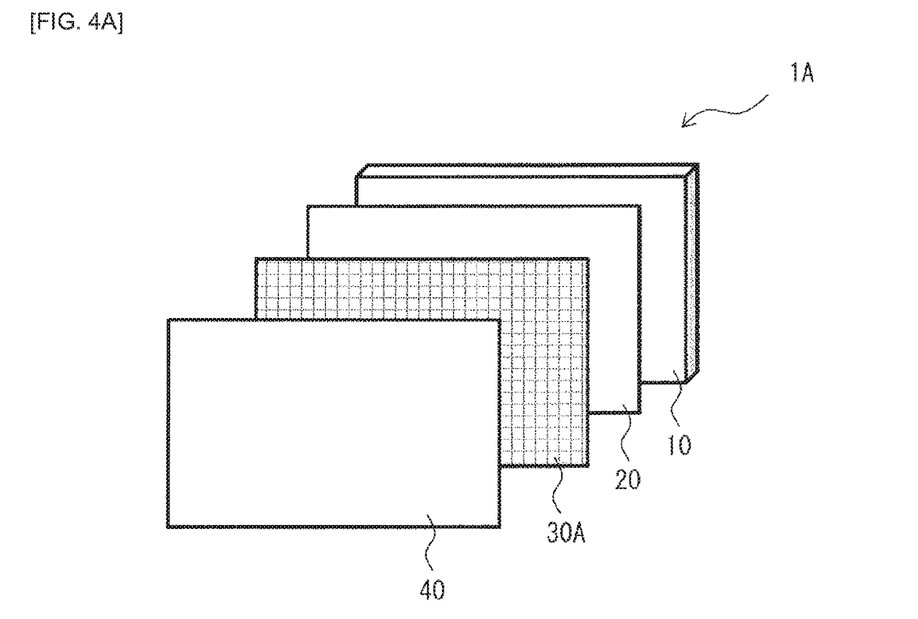
FIG. 4A is a schematic view of a first modification example of the display device illustrated in FIG. 1.

FIG. 4A is a schematic view of a display device 1A that is a first modification example of the display device 1 according to the first embodiment described above. The display device 1A includes a dimmer element 30A in which the switching between the dark mode and the bright mode in the dimmer element 30 is selectively allowed in a partial region within a plane intersecting a transmission direction in which the image display light L3 is transmitted. For example, the dimmer element 30A is divided into a plurality of subregions that is arranged in matrix, and electrodes are disposed in the respective subregions, thereby partially applying a voltage to the guest-host type liquid crystal layer 31. With the structure as described above, in the display device 1A, it is possible to perform partial light/dark control in the dimmer element 30A, thus making it possible to increase a contrast ratio within the plane of a display image generated in the image display section 10.

3. Second Modification Example of First Embodiment

Figure 4B:
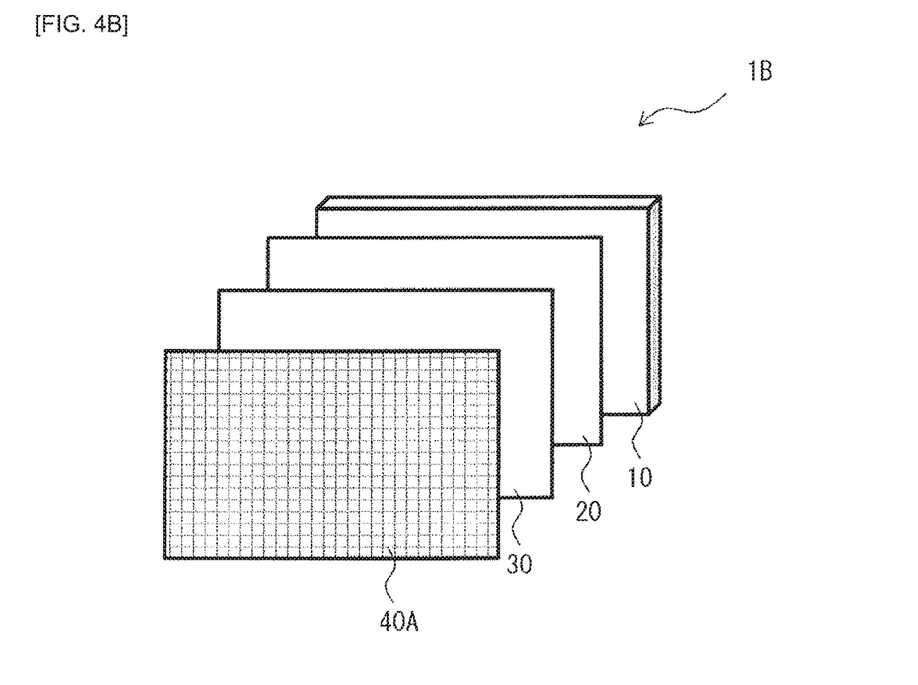
FIG. 4B is a schematic view of a second modification example of the display device illustrated in FIG. 1.

FIG. 4B is a schematic view of a display device 1B that is a second modification example of the display device 1 according to the first embodiment described above. The display device 1B includes a dimmer element 40 in which the switching between the scattering mode and the linear travel mode is selectively allowed in a partial region within a plane intersecting a transmission direction in which the external light L1 and the reflected light L2 are transmitted. For example, the dimmer element 40A is divided into a plurality of subregions that is arranged in matrix, and electrodes are disposed in the respective subregions, thereby partially applying a voltage to the polymer dispersed liquid crystal layer 41. With the structure as described above, in the display device 1B, it is possible to perform partial light scattering intensity control on the dimmer element 40A. Hence, it is possible for the display device 1B to provide partial impression of blur (bokeh) to the display image generated in the image display section 10, thus allowing for wider visual expression.

4. Third Modification Example of First Embodiment

Figure 5A:
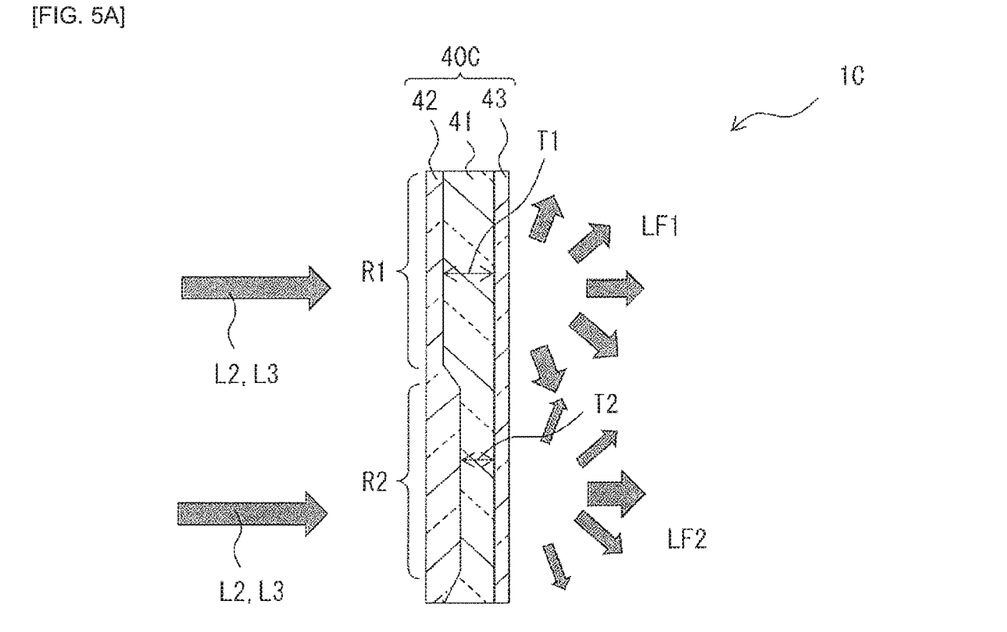
FIG. 5A is a schematic view of a third modification example of the display device illustrated in FIG. 1.

FIG. 5A is a schematic view of a portion of a display device 1C that is a third modification example of the display device 1 according to the first embodiment described above. The display device 1C has substantially the same structure as that of the display device 1 except that the display device 1C includes a dimmer element 40C instead of the dimmer element 40. The dimmer element 40C includes a region R1 in which the polymer dispersed liquid crystal layer 41 has a thickness T1 and a region R2 in which the polymer dispersed liquid crystal layer 41 has a thickness T2 (<T1). Hence, in a case where light is transmitted through the region R1, the transmitted light (the reflected light L2 and the image display light L3) is scattered relatively intensely as compared with a case where the light is transmitted through the region R2. Scattered light LF1 that has been transmitted through the region R1 is scattered intensely as compared with scattered light LF2 that has been transmitted through the region R2. Hence, the display device 1C has scattering intensity distribution within a plane intersecting a transmission direction in which the transmitted light is transmitted, thus allowing appearance of light and shade caused by a difference in the scattering intensity in a whitish screen in the bright display state. In other words, appropriately setting the positions in which the region R1 and the region R2 are disposed makes it possible to draw a desired pattern on the screen in the bright display state. Hence, in a case where the display device 1C is installed on a wall surface or the like, it is possible to enhance design.

5. Fourth Modification Example of First Embodiment

Figure 5B:
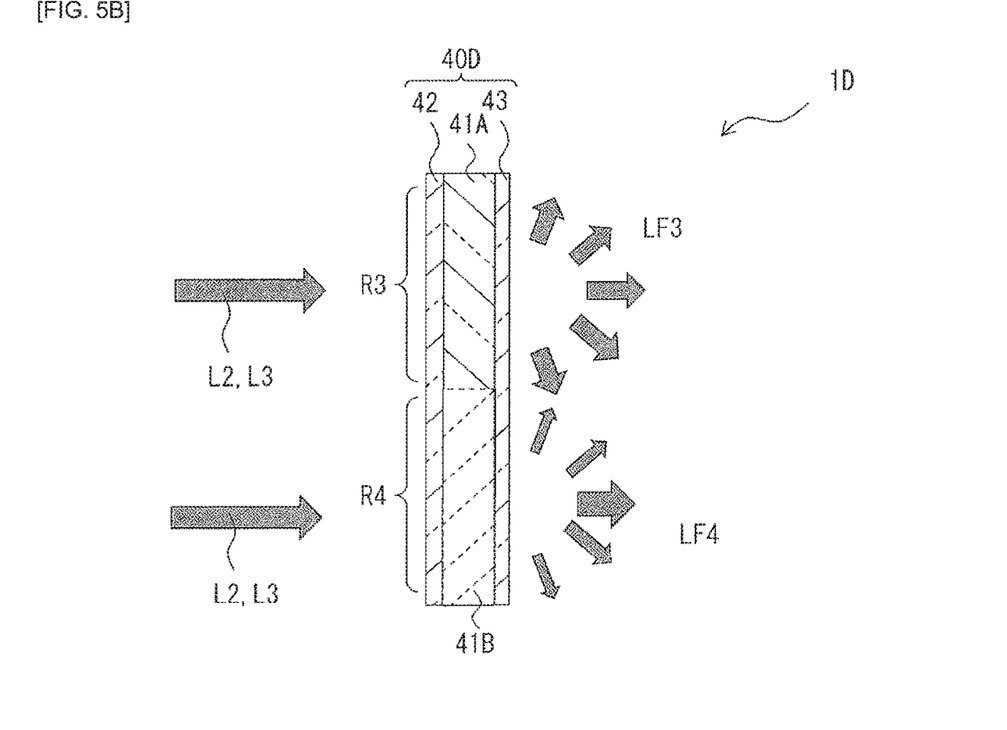
FIG. 5B is a schematic view of a fourth modification example of the display device illustrated in FIG. 1.

FIG. 5B is a schematic view of a portion of a display device 1D that is a fourth modification example of the display device 1 according to the first embodiment described above. The display device 1D has substantially the same structure as that of the display device 1 except that the display device 1D includes a dimmer element 40D instead of the dimmer element 40. The dimmer element 40D includes a region R3 in which the polymer dispersed liquid crystal layer 41 is constituted by a polymer dispersed liquid crystal 41A and a region R4 in which the polymer dispersed liquid crystal layer 41 is constituted by a polymer dispersed liquid crystal 41B. For example, a polymerization ratio in a polymer included in the polymer dispersed liquid crystal 41A is different from a polymerization ratio in a polymer included in the polymer dispersed liquid crystal 41B. Hence, in a case where light is transmitted through the region R3, the transmitted light (the reflected light L2 and the image display light L3) is scattered relatively intensely (or weakly) as compared with a case where the light is transmitted through the region R4. For example, scattered light LF3 that has been transmitted through the region R3 is scattered intensely as compared with scattered light LF4 that has been transmitted through the region R4. Hence, in the display device 1D, light and shade caused by a difference in the scattering intensity appear in a whitish screen in the bright display state. In other words, appropriately setting the positions in which the region R3 and the region R4 are disposed makes it possible to draw a desired pattern on the screen in the bright display state. Hence, in a case where the display device 1D is installed on a wall surface or the like, it is possible to enhance design.

6. Application Example (Electronic Apparatus)

Figure 6:
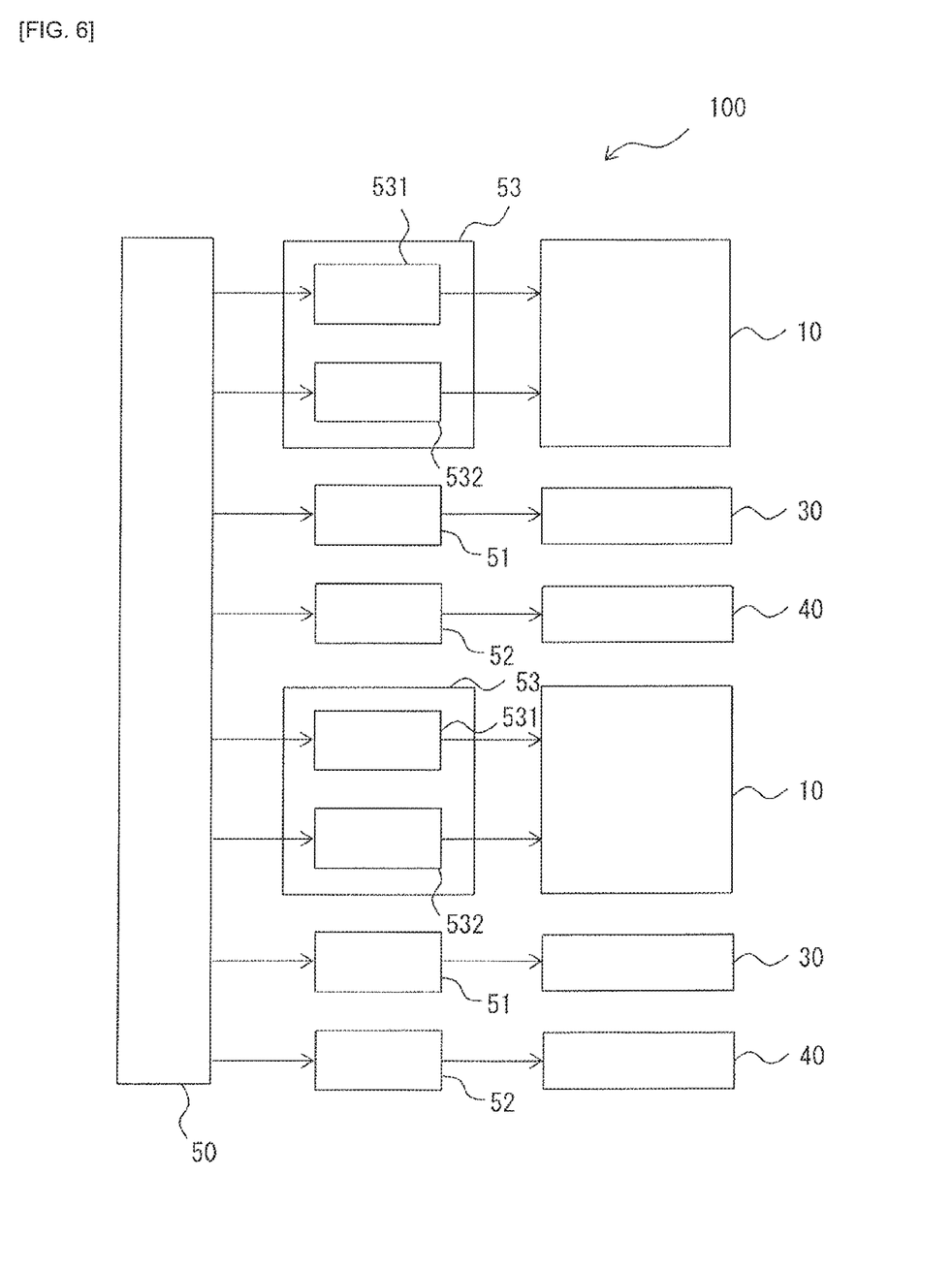
FIG. 6 is a conceptual diagram illustrating a configuration example of an electronic apparatus that includes the display device of the present disclosure.
Figure 8:
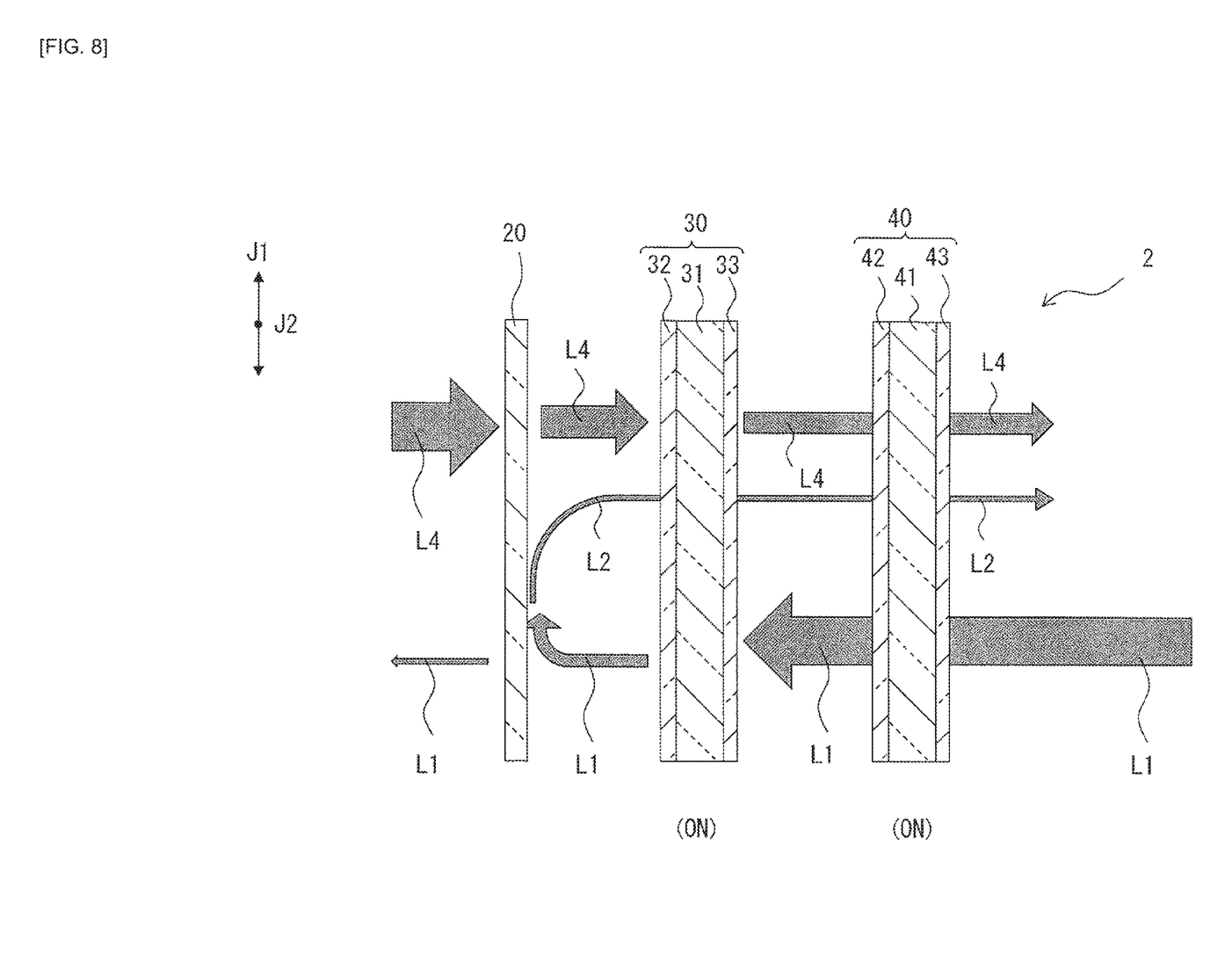
FIG. 8 is a second explanatory diagram illustrating the workings of the display device illustrated in FIG. 7.

Next, description is given with reference to FIG. 6 of an electronic apparatus 100 that includes the display devices 1. FIG. 8 is a schematic view of an overall configuration of the electronic apparatus 100.

The electronic apparatus 100 includes the display devices 1 of the first embodiment described above. FIG. 8 is a block diagram schematically illustrating a display control system of the display device 1 that is disposed within the electronic apparatus 100. The electronic apparatus 100 includes a plurality of display devices 1. The display device 1 includes, as the switching drive section 53, a display drive section 531 and an illumination drive section 532. In the electronic apparatus 100, the control section 50 performs control on the switching drive sections 51 to 53.

The display drive section 531 supplies a drive voltage between the transparent electrode substrates 12 and 13 provided in the image display section 10 of the display device 1; for example, in a multiplex drive method or an active drive method, a scan signal and a data signal corresponding to the scan signal are supplied in synchronization, respectively, with a common terminal (scan line terminal) and a segment terminal (data line terminal) of a liquid crystal panel. Display data such as image data is fed from a main circuit of the electronic apparatus 100 through the control section 50 to the display drive section 531.

The illumination drive section 532 drives the backlight 14 of the image display section 10. More specifically, the illumination drive section 532 controls power supply to the backlight 14, and for example, functions to switch between lighting state and extinction state of the backlight 14.

The control section 50 controls each of the switching drive sections 51 to 53, and performs provision of control commands, feeding of data, and the like to each of the sections. For example, the control section 50 provides a control command to the switching drive section 51 to thereby perform an operation of switching between the dark mode and the bright mode in the dimmer element 30, and provides a control command to the switching drive section 52 to perform an operation of switching between the scattering mode and the linear travel mode in the dimmer element 40.

As described above, according to the electronic apparatus 100 of the present disclosure, the display devices 1 described above are provided, thus making it possible to achieve a plurality of desired optical states visually recognized by the observer, with the result that it is possible to achieve superior display performance by utilization of the optical states.

Examples of the electronic apparatus 100 include a television, a digital camera, a notebook personal computer, a mobile phone, a smartphone, a portable terminal device such as a tablet terminal device, a video camera, and the like. In other words, the display device described above is applicable to electronic apparatuses in every field that display, as an image or a video, externally inputted video signals or internally generated video signals.

7. Second Embodiment

[Configuration of Dimmer Device 2]

Figure 7:
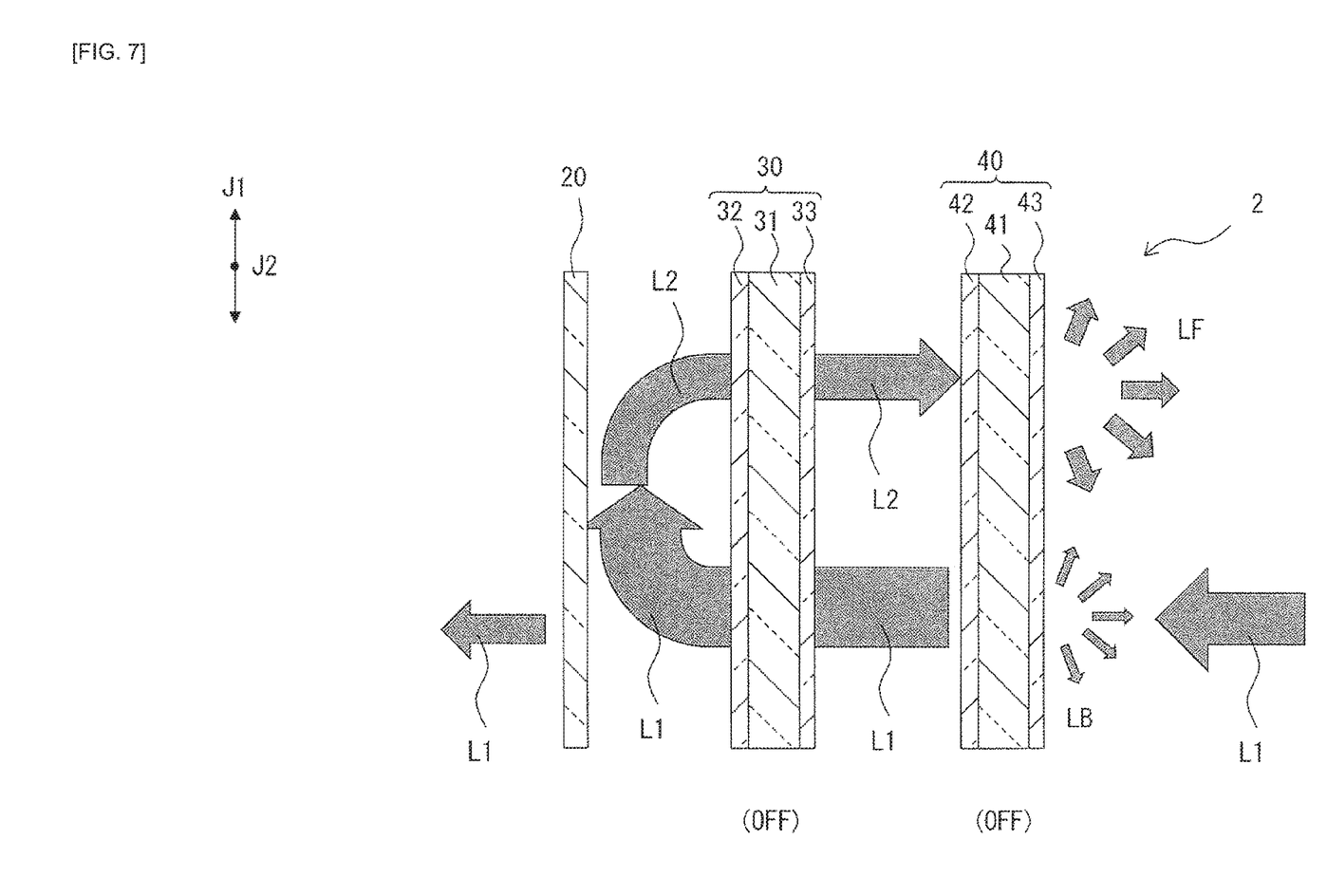
FIG. 7 is a first explanatory diagram illustrating an optical device according to a second embodiment of the present disclosure and workings thereof.
Figure 9:
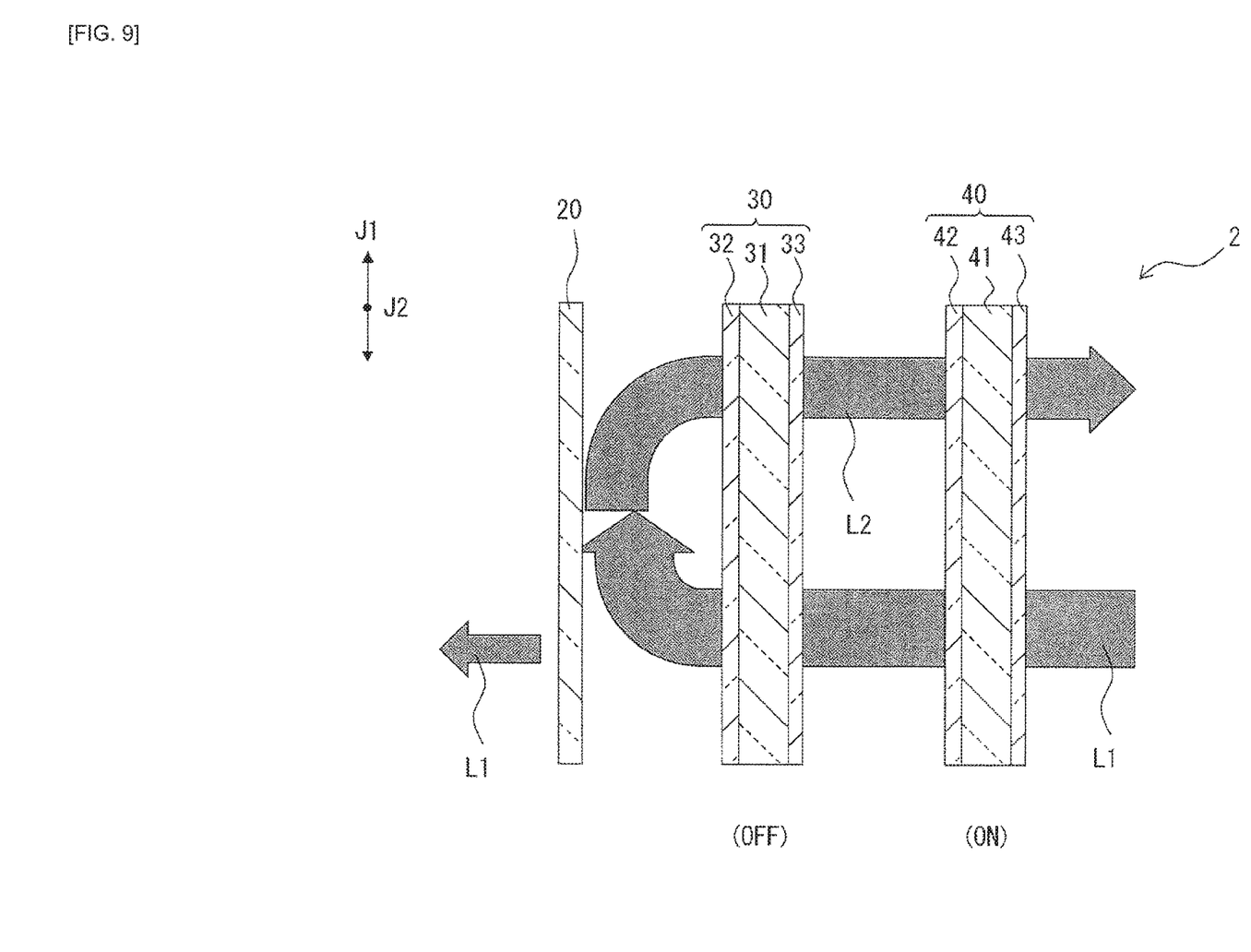
FIG. 9 is a third explanatory diagram illustrating the workings of the display device illustrated in FIG. 7.

FIGS. 7 to 9 are each a schematic view illustrating a dimmer device 2 according to a second embodiment of the present disclosure. In the dimmer device 2, the partial transmission mirror 20, the dimmer element 30, and the dimmer element 40 are disposed in order from side distant from the observer. The dimmer device 2 has substantially the same structure as that of the display device 1 described in the first embodiment described above except that the dimmer device 2 does not include the image display section 10.

[Operation of Dimmer Device 2]

The dimmer device 2 performs an operation of switching between the dark mode and the bright mode in the dimmer element 30 and an operation of switching between the scattering mode and the linear travel mode in the dimmer element 40, thus making it possible to achieve a plurality of desired optical states. For example, switching is performed among the bright display state where a whitish color is obtained by the scattering of the external light L1 in the dimmer element 40, a background display state where the dimmer element 30 enters the dark mode and the dimmer element 40 enters a transmission state to display a background, and a reflection state where the external light L1 is reflected and the reflected light L2 is visually recognized by the observer.

In the following, description is given in detail, as an example of the operation of the dimmer device 2, of behaviors in the three states of the bright display state, the background display state, and the reflection state described above.

(Behavior of Dimmer Device 2 in Bright Display State)

In the dimmer device 2, as illustrated in FIG. 7, the bright display state is achieved in a case where a voltage is applied neither to the guest-host type liquid crystal layer 31 of the dimmer element 30 nor to the polymer dispersed liquid crystal layer 41 of the dimmer element 40 (in the case of the off-state). In this case, the dimmer element 30 enters the bright mode in which all incident light beams including both the linearly polarized light having the first polarization axis J1 and the linearly polarized light having the second polarization axis J2 are transmitted at the third transmittance higher than the first transmittance in the dark mode. Meanwhile, the dimmer element 40 enters the scattering mode exhibiting the first scattering intensity that is relatively high for the transmitted light transmitted therethrough.

In the dimmer device 2, in the bright display state illustrated in FIG. 7, for example, the external light L1 that is applied from the side of the observer to the dimmer element 40 is transmitted through the dimmer element 40 at, for example, a transmittance of about 95%, and thereafter enters the dimmer element 30. The external light L1 that has entered the dimmer element 30 is transmitted through the dimmer element 30 at, for example, a transmittance of about 74%, and thereafter enters the partial transmission mirror 20. In addition, a portion of the external light L1 that has entered the dimmer element 40 is weak backscattered light LB that is scattered toward the side, of the observer, of the dimmer element 40. For example, about 60% of the external light L1 that has entered the partial transmission mirror 20 is reflected at the partial transmission mirror 20, and is returned as the reflected light L2 to the dimmer element 30. It is to be noted that a portion of the external light L1 that has entered the partial transmission mirror 20 is transmitted through the partial transmission mirror 20 at, for example, a transmittance of about 40%.

The reflected light L2 that is returned from the partial transmission mirror 20 to the dimmer element 30 is transmitted through the dimmer element 30 at a transmittance of about 74%, and thereafter enters the dimmer element 40. Furthermore, the reflected light L2 that has entered the dimmer element 40 from the partial transmission mirror 20 is transmitted through the dimmer element 40 at a transmittance of about 95% to be forward scattered light LF. As a result, in the entire display device 1, about 47% of the external light L1 that has entered the dimmer element 40 is outputted as the reflected light (the backscattered light LB and the forward scattered light LF) from the dimmer element 40 to the side of the observer. At that time, the surface of the dimmer element 40 on the side of the observer is brought into a milky display state. The reflectance of wall paper is generally assumed to be about 40% to 70%; thus, in a case where the dimmer device 2 of the present disclosure is installed on a wall surface, it is possible for the dimmer device 2 to achieve the bright display state while sufficiently reducing an uncomfortable feeling with the wall.

(Behavior of Dimmer Device 2 in Background Display State)

In the dimmer device 2, in a case where a voltage is applied both to the guest-host type liquid crystal layer 31 of the dimmer element 30 and the polymer dispersed liquid crystal layer 41 of the dimmer element 40 (in the case of the on-state), the background display state is achieved (FIG. 8). In this case, the dimmer element 30 exhibits polarization along the transmission axis J30 by orientation of the pigment material such as a black pigment contained in the guest-host type liquid crystal layer 31 along the direction in which the liquid crystal molecules are oriented. Hence, the dimmer element 30 enters the dark mode in which the linearly polarized light having the first polarization axis J1 is transmitted at the first transmittance and in which the linearly polarized light having the second polarization axis J2 is transmitted at the second transmittance lower than the first transmittance. Meanwhile, the dimmer element 40 enters the linear travel mode (approximate transparent mode) exhibiting the second scattering intensity for the transmitted light transmitted therethrough that is lower than the first scattering intensity.

In the dimmer device 2, in the background display state illustrated in FIG. 8, for example, the external light L1 that is applied from the side of the observer to the dimmer element 40 is transmitted through the dimmer element 40 at, for example, a transmittance of about 98%, and thereafter enters the dimmer element 30. A linearly polarized component along the first polarization axis J1 of the external light L1 that has entered the dimmer element 30 is transmitted through the dimmer element 30 at, for example, a transmittance of about 46%, and a linearly polarized component along the second polarization axis J2 is transmitted through the dimmer element 30 at a transmittance of about 10%, and thereafter enters the partial transmission mirror 20. For example, about 60% of the external light L1 that has entered the partial transmission mirror 20 is reflected at the partial transmission mirror 20, and is returned as the reflected light L2 to the dimmer element 30. It is to be noted that a portion of the external light L1 that has entered the partial transmission mirror 20 is transmitted through the partial transmission mirror 20 at, for example, a transmittance of about 40%. The reflected light L2 that is returned from the partial transmission mirror 20 to the dimmer element 30 is sequentially transmitted through the dimmer element 30 and the dimmer element 40. As a result, in the entire display device 1, about 12% of the external light L1 that has entered the dimmer element 40 is outputted as the reflected light L2 from the dimmer element 40 to the side of the observer.

In addition, external light L4 that enters the partial transmission mirror 20 from a side opposite to the dimmer element 30 as viewed from the partial transmission mirror 20 is transmitted through the partial transmission mirror 20 at a transmittance of about 40%, and enters the dimmer element 30. The external light L4 that has entered the dimmer element 30 does not generally have polarization, and thus is equally divided into the first polarization axis J1 and the second polarization axis J2. Hence, the external light L4 is transmitted through the dimmer element 30 at a transmittance of about 28% that is an average value of a transmittance of about 46% for the polarized light having the first polarization axis J1 and a transmittance of about 10% for the polarized light having the second polarization axis J2, and thereafter enters the dimmer element 40. The external light L4 that has entered the dimmer element 40 is transmitted through the dimmer element 40 at a transmittance of about 98%. As a result, in the entire display device 1, about 11% of the external light L4 that has entered the partial transmission mirror 20 is outputted from the dimmer element 40 to the side of the observer. Hence, in a case where a luminance of the external light L4 is low, the dimmer device 2 is visually recognized by the observer as a black display in the background display state. On the other hand, in a case where the luminance of the external light L4 is high, such as a case where the external light L4 is outdoor light, the observer is able to visually recognize the external light L4 in the background display state.

(Behavior of Dimmer Device 2 in Reflection State)

Furthermore, in the dimmer device 2, in a case where a voltage is not applied to the guest-host type liquid crystal layer 31 of the dimmer element 30 (in the case of the off-state) and where a voltage is applied to the polymer dispersed liquid crystal layer 41 of the dimmer element 40 (in the case of the on-state), the reflection state is achieved (FIG. 9). In the reflection state illustrated in FIG. 9, for example, the external light L1 that is applied from the side of the observer to the dimmer element 40 is transmitted through the dimmer element 40 at, for example, a transmittance of about 98%, and thereafter enters the dimmer element 30. The external light L1 that has entered the dimmer element 30 is transmitted through the dimmer element 30 at, for example, a transmittance of about 74%, and thereafter enters the partial transmission mirror 20. For example, about 60% of the external light L1 that has entered the partial transmission mirror 20 is reflected at the partial transmission mirror 20, and is returned as the reflected light L2 to the dimmer element 30. It is to be noted that a portion of the external light L1 that has entered the partial transmission mirror 20 is transmitted through the partial transmission mirror 20 at, for example, a transmittance of about 40%. The reflected light L2 that is returned from the partial transmission mirror 20 to the dimmer element 30 is transmitted through the dimmer element 30 at a transmittance of about 74%, and thereafter enters the dimmer element 40. Furthermore, the reflected light L2 that has entered the dimmer element 40 from the partial transmission mirror 20 is transmitted through the dimmer element 40 at a transmittance of about 98% without being scattered. As a result, in the entire display device 1, about 32% of the external light L1 that has entered the dimmer element 40 is outputted as the reflected light L2 from the dimmer element 40 to the side of the observer. Hence, the observer is able to utilize the dimmer device 2 as a mirror.

[Workings and Effects of Dimmer Device 2]

In the dimmer device 2 of the present embodiment, as described above, the partial transmission mirror 20, the dimmer element 30, and the dimmer element 40 are disposed in order, the operation of switching between the bright mode and the dark mode is performed in the dimmer element 30 and the scattering intensity is adjusted in the dimmer element 40. Hence, switching is performed among the background display state where the dimmer element 30 enters the dark mode and the dimmer element 40 enters the linear travel mode to display a background, the bright display state where the dimmer element 30 enters the bright mode and external light is scattered in the dimmer element 40 to thereby obtain a whitish color, and the reflection state where the dimmer element 30 enters the dark mode and the dimmer element 40 enters the linear travel mode to allow for display of the image display light of the image display section 10 and a bright display state where the dimmer element 30 enters the bright mode and the dimmer element 40 enters the linear travel mode to thereby reflect the external light L1 that enters the dimmer element 40 from side opposite to the dimmer element 30 at the partial transmission mirror 20. As a result, it is possible for the dimmer device 2 to achieve a plurality of desired optical states and thus to achieve superior display performance by utilization of the optical states.

Although the description has been given of the present disclosure by referring to the embodiments and the modification examples, the present disclosure is not limited to the foregoing embodiments, etc., and may be modified in a wide variety of ways. For example, the description has been given, in the foregoing embodiments, etc., by specifically referring to the configurations of the display device 1, the electronic apparatus 100, and the dimmer device 2; however, those configurations do not need to include all the components described above, and may include other components.

Further, the reflectance and the transmittance described in the foregoing embodiments, etc. are illustrative, and the present disclosure is not limited to such numerical values. In addition, although in the foregoing embodiments, etc., the description is given of the case where the dimmer element 30 contains the pigment material, at least one of a first dimmer member or a second dimmer member may contain the pigment material in the present disclosure. In addition, in the present disclosure, the switching between the first mode and the second mode in the first dimmer member may be selectively implementable in a partial region within a plane intersecting the transmission direction in which the image display light is transmitted, and the switching between the third mode and the fourth mode in the second dimmer member is selectively implementable in a partial region within a plane intersecting the transmission direction in which the transmitted light is transmitted.

It is to be noted that the effects described in the present specification are merely illustrative and not limited to the effects described above, and may include other effects. Moreover, the present technology may include the following configurations.

(1)
A display device including, in order:
an image display section that emits image display light having a first polarization axis;
a beam splitter that transmits a portion of the image display light and reflects another portion of the image display light;
a first dimmer member configured to switch between a first mode and a second mode, the first mode causing first light having the first polarization axis to be transmitted at a first transmittance and causing second light having a second polarization axis to be transmitted at a second transmittance that is lower than the first transmittance, the second mode causing the first light and the second light to be transmitted at a third transmittance that is higher than the first transmittance; and
a second dimmer member configured to adjust a scattering intensity of transmitted light transmitted therethrough.

(2)
The display device according to (1), in which the portion of the image display light that is transmitted through the beam splitter has the first polarization axis.

(3)
The display device according to (1) or (2), in which the second dimmer member is configured to switch between a third mode and a fourth mode, the third mode exhibiting a first scattering intensity for the transmitted light transmitted therethrough, the fourth mode exhibiting a second scattering intensity for the transmitted light transmitted therethrough, the second scattering intensity being lower than the first scattering intensity.

(4)
The display device according to any one of (1) to (3), in which the first dimmer member has a structure in which a first transparent electrode, a guest-host type liquid crystal layer including a guest-host type liquid crystal, and a second transparent electrode are stacked in order.

(5)
The display device according to any one of (1) to (4), in which the second dimmer member has a structure in which a third transparent electrode, a polymer dispersed liquid crystal layer, and a fourth transparent electrode are stacked in order.

(6)
The display device according to (5), in which the second dimmer member includes a first region in which the polymer dispersed liquid crystal layer has a first thickness and a second region in which the polymer dispersed liquid crystal layer has a second thickness.

(7)
The display device according to any one of (1) to (6), in which the second dimmer member has scattering intensity distribution within a plane intersecting a transmission direction in which the transmitted light is transmitted.

(8)
The display device according to any one of (1) to (7), in which at least one of the first dimmer member or the second dimmer member contains a pigment material.

(9)
The display device according to any one of (1) to (8), in which the switching between the first mode and the second mode in the first dimmer member is selectively implementable in a partial region within a plane intersecting a transmission direction in which the image display light is transmitted.

(10)
The display device according to (3), in which the switching between the third mode and the fourth mode in the second dimmer member is selectively implementable in a partial region within a plane intersecting a transmission direction in which the transmitted light is transmitted.

(11)
The display device according to (3), in which
the switching between the first mode and the second mode in the first dimmer member is selectively implementable in a partial region within a plane intersecting a transmission direction in which the image display light is transmitted, and
the switching between the third mode and the fourth mode in the second dimmer member is selectively implementable in a partial region within a plane intersecting a transmission direction in which the transmitted light is transmitted.

(12)
An optical device including, in order:
a beam splitter that transmits a portion of incident light and reflects another portion of the incident light;
a first dimmer member configured to switch between a first mode and a second mode, the first mode causing a first transmittance for first light having a first polarization axis to be higher than a second transmittance for second light having a second polarization axis that is different from the first polarization axis, the second mode causing the first transmittance and the second transmittance to be substantially equal to each other; and
a second dimmer member configured to adjust a scattering intensity of transmitted light transmitted therethrough.

(13)
An electronic apparatus including a display device, the display device including, in order an image display section that emits image display light having a first polarization axis,
a beam splitter that transmits a portion of the image display light and reflects another portion of the image display light,
a first dimmer member configured to switch between a first mode and a second mode, the first mode causing first light having the first polarization axis to be transmitted at a first transmittance and causing second light having a second polarization axis to be transmitted at a second transmittance that is lower than the first transmittance, the second mode causing the first light and the second light to be transmitted at a third transmittance that is higher than the first transmittance, and a second dimmer member configured to adjust a scattering intensity of transmitted light transmitted therethrough.

This application claims the benefit of Japanese Priority Patent Application JP2017-170961 filed with the Japan Patent Office on Sep. 6, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display device comprising, in order:
an image display section configures to emit image display light having a first polarization axis;
a beam splitter configured to transmit a portion of the image display light and reflect another portion of the image display light;
a first dimmer member configured to switch between a first mode and a second mode, the first mode causing first light having the first polarization axis to be transmitted at a first transmittance and causing second light having a second polarization axis to be transmitted at a second transmittance that is lower than the first transmittance, the second mode causing the first light and the second light to be transmitted at a third transmittance that is higher than the first transmittance; and
a second dimmer member configured to adjust a scattering intensity of transmitted light transmitted therethrough.

2. The display device according to claim 1, wherein the portion of the image display light that is transmitted through the beam splitter has the first polarization axis.

3. The display device according to claim 1, wherein the second dimmer member is configured to switch between a third mode and a fourth mode, the third mode exhibiting a first scattering intensity for the transmitted light transmitted therethrough, the fourth mode exhibiting a second scattering intensity for the transmitted light transmitted therethrough, the second scattering intensity being lower than the first scattering intensity.

4. The display device according to claim 1, wherein the first dimmer member has a structure in which a first transparent electrode, a guest-host type liquid crystal layer including a guest-host type liquid crystal, and a second transparent electrode are stacked in order.

5. The display device according to claim 1, wherein the second dimmer member has a structure in which a third transparent electrode, a polymer dispersed liquid crystal layer, and a fourth transparent electrode are stacked in order.

6. The display device according to claim 5, wherein the second dimmer member includes a first region in which the polymer dispersed liquid crystal layer has a first thickness and a second region in which the polymer dispersed liquid crystal layer has a second thickness.

7. The display device according to claim 1, wherein the second dimmer member has scattering intensity distribution within a plane intersecting a transmission direction in which the transmitted light is transmitted.

8. The display device according to claim 1, wherein at least one of the first dimmer member or the second dimmer member contains a pigment material.

9. The display device according to claim 1, wherein the switching between the first mode and the second mode in the first dimmer member is selectively implementable in a partial region within a plane intersecting a transmission direction in which the image display light is transmitted.

10. The display device according to claim 3, wherein the switching between the third mode and the fourth mode in the second dimmer member is selectively implementable in a partial region within a plane intersecting a transmission direction in which the transmitted light is transmitted.

11. The display device according to claim 3, wherein
the switching between the first mode and the second mode in the first dimmer member is selectively implementable in a partial region within a plane intersecting a transmission direction in which the image display light is transmitted, and
the switching between the third mode and the fourth mode in the second dimmer member is selectively implementable in a partial region within a plane intersecting a transmission direction in which the transmitted light is transmitted.

12. An optical device comprising, in order:
a beam splitter configured to transmit a portion of incident light and reflect another portion of the incident light;
a first dimmer member configured to switch between a first mode and a second mode, the first mode causing a first transmittance for first light having a first polarization axis to be higher than a second transmittance for second light having a second polarization axis that is different from the first polarization axis, the second mode causing the first transmittance and the second transmittance to be substantially equal to each other; and
a second dimmer member configured to adjust a scattering intensity of transmitted light transmitted therethrough.

13. An electronic apparatus comprising a display device, the display device including, in order
an image display section configured to emit image display light having a first polarization axis,
a beam splitter configured to transmit a portion of the image display light and reflect another portion of the image display light,
a first dimmer member configured to switch between a first mode and a second mode, the first mode causing first light having the first polarization axis to be transmitted at a first transmittance and causing second light having a second polarization axis to be transmitted at a second transmittance that is lower than the first transmittance, the second mode causing the first light and the second light to be transmitted at a third transmittance that is higher than the first transmittance, and
a second dimmer member configured to adjust a scattering intensity of transmitted light transmitted therethrough.

* * * * *